US007161152B2

(12) United States Patent
DiPoala

(10) Patent No.: US 7,161,152 B2
(45) Date of Patent: Jan. 9, 2007

(54) METHOD AND APPARATUS FOR REDUCING FALSE ALARMS DUE TO WHITE LIGHT IN A MOTION DETECTION SYSTEM

(75) Inventor: William S DiPoala, Fairport, NY (US)

(73) Assignee: Robert Bosch GmbH, Stuttgart (DE)

( * ) Notice: Subject to any disclaimer, the term of this patent is extended or adjusted under 35 U.S.C. 154(b) by 211 days.

(21) Appl. No.: 10/736,865

(22) Filed: Dec. 16, 2003

(65) Prior Publication Data

US 2005/0127298 A1 Jun. 16, 2005

(51) Int. Cl.
*G01J 5/02* (2006.01)

(52) U.S. Cl. .................... 250/342; 250/338.3; 250/349

(58) Field of Classification Search ................ 250/342, 250/338.1, 338.3, 339.04, 339.15, 349; 340/522, 340/545.3

See application file for complete search history.

(56) References Cited

U.S. PATENT DOCUMENTS

| | | | | |
|---|---|---|---|---|
| 4,746,910 | A | 5/1988 | Pfister et al. | |
| 4,764,755 | A | 8/1988 | Pedtke et al. | |
| 4,894,527 | A | 1/1990 | Smith | |
| 4,902,887 | A | 2/1990 | Everett, Jr. | |
| 4,905,292 | A | 2/1990 | Wentworth et al. | |
| 5,128,654 | A | 7/1992 | Griffin et al. | |
| 5,189,393 | A | 2/1993 | Hu | |
| 5,699,243 | A | 12/1997 | Eckel et al. | |
| 5,701,117 | A * | 12/1997 | Platner et al. | 340/567 |
| 6,188,318 | B1 * | 2/2001 | Katz et al. | 340/545.3 |
| 6,198,389 | B1 * | 3/2001 | Buccola | 340/517 |
| 6,215,399 | B1 * | 4/2001 | Shpater | 340/567 |
| 6,246,321 | B1 | 6/2001 | Rechsteiner et al. | |
| 6,288,395 | B1 * | 9/2001 | Kuhnly et al. | 250/339.04 |
| 6,486,778 | B1 * | 11/2002 | Mahler et al. | 340/567 |
| 2002/0011570 | A1 | 1/2002 | Castleman | |

FOREIGN PATENT DOCUMENTS

| | | |
|---|---|---|
| DE | 42 36 618 A1 | 5/1994 |
| DE | 101 057 531 A1 | 6/2003 |

OTHER PUBLICATIONS

Copy of European Search Report mailed Apr. 18, 2005.

* cited by examiner

*Primary Examiner*—David Porta
*Assistant Examiner*—Faye Boosalis
(74) *Attorney, Agent, or Firm*—Baker & Daniels LLP

(57) ABSTRACT

A motion detection system includes a first sensor sensitive to infrared light in at least one detection zone and generating a first output signal representative of the detected level of infrared light. A second sensor is sensitive to visible light and generates a second output signal representative of the detected level of visible light. The second sensor is positioned proximate the first sensor. A processor is programmed to generate an alarm signal based upon the first and second output signals. The alarm signal is generated when first and second conditions are satisfied. The first condition is satisfied when the first output signal indicates motion has occurred in the at least one detection zone. The second condition is satisfied when the second output signal does not correlate to the first output signal.

17 Claims, 3 Drawing Sheets

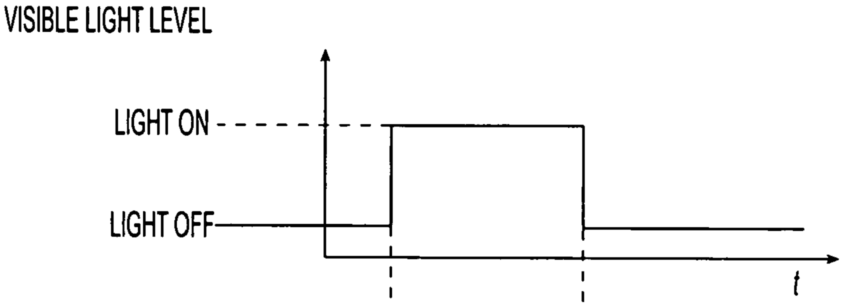
Fig. 3A
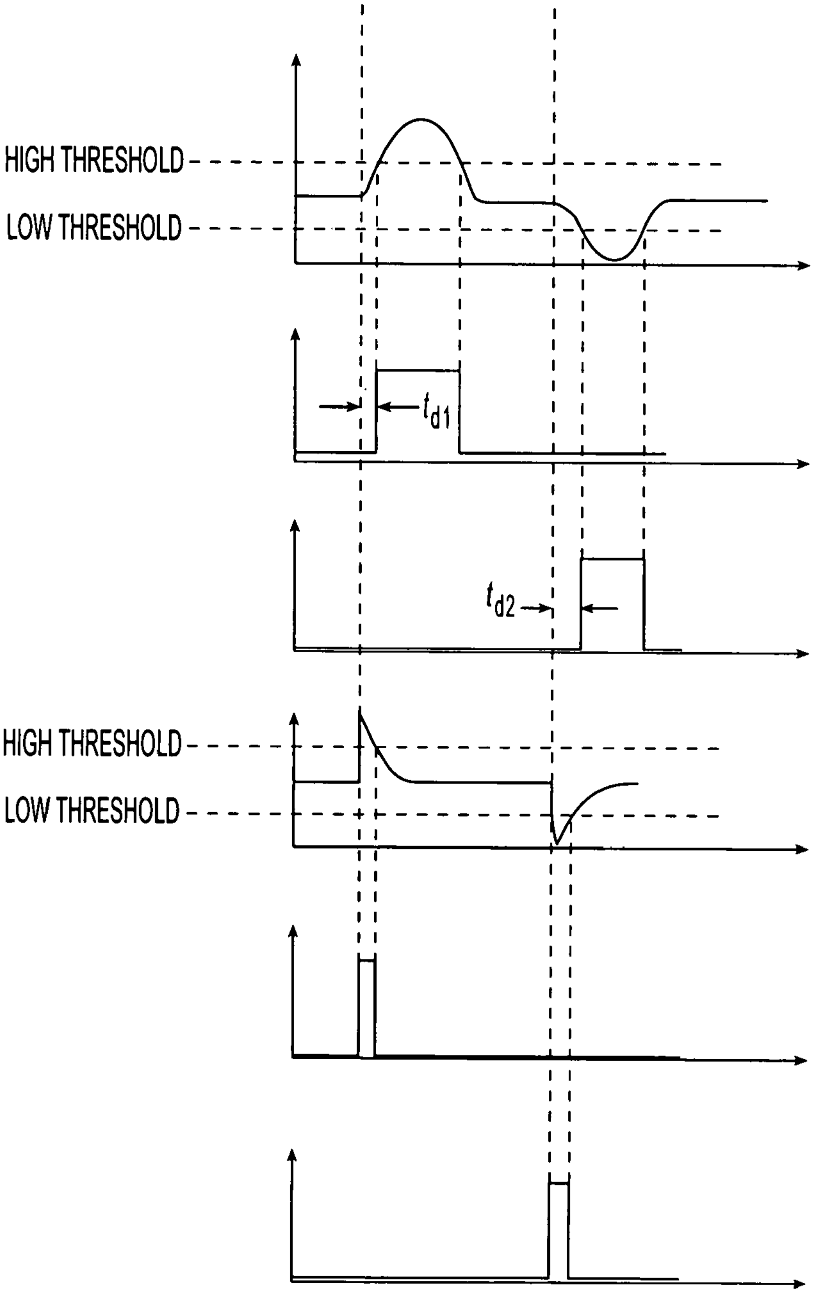
Fig. 3B
Fig. 3C
Fig. 3D
Fig. 3E
Fig. 3F
Fig. 3G

METHOD AND APPARATUS FOR REDUCING FALSE ALARMS DUE TO WHITE LIGHT IN A MOTION DETECTION SYSTEM

BACKGROUND OF THE INVENTION

1. Field of the Invention

The present invention relates to motion detection systems, and, more particularly, to motion detection systems using passive infrared (PIR) motion sensors.

2. Description of the Related Art

It is known that all objects transmit a level of infrared light that varies with the temperature of the object. Taking advantage of this characteristic, passive infrared (PIR) motion sensors are used in security systems to detect motion of a relatively warm body that emanates a relatively high level of infrared light, such as a human intruder or motor vehicle. The sensors monitor the level of infrared light emanating from each of a plurality of detection zones. If the level of infrared light in any of the detection zones suddenly increases by a significant amount, as detected by the motion sensors, then the motion sensors transmit an alarm signal. The alarm signal indicates that the motion sensor has sensed the motion of a warm body.

A problem is that the pyroelectric sensing elements used in PIR motion sensors are sensitive to broad band visible light as well as to infrared light. Thus, it is possible for visible light to be interpreted by the PIR motion sensor as infrared light, thereby causing the sensor to issue a false alarm. Visible light produced by car headlights and handheld flashlights are typical false alarm sources.

It is known to add a multilayer silicon filter to the pyroelectric sensing element package in order to reduce the amount of visible light that reaches the pyroelectric sensing element. However, some small amount of visible light still passes through the filter. Additionally, some of the visible light illuminating the filter is converted and reradiated as infrared light. The polyethylene fresnel lens or window of the optical assembly of the motion sensor is commonly impregnated with pigments in order to provide additional filtering. Even with these measures, the PIR motion detector is subject to issuing false alarms due to visible light levels ranging from a few hundred lux to several thousand lux. Including more than one multilayer silicon filter or adding more pigment to the fresnel lens beyond an optimal amount results in a reduction of the sensitivity of the motion detector to the infrared light and impairs the overall performance of the motion detector.

Moreover, many countries have regulations that require that a motion detector be immune to visible light up to 6,500 lux, which is approximately the level of light produced by a car headlight aimed at the PIR sensor at a distance of ten feet. If a motion detector does not comply with such regulations, it will likely be barred from being sold within the country in which the regulations are in effect.

What is needed in the art is a motion detection system that is not susceptible to issuing false alarms due to the presence of visible light.

SUMMARY OF THE INVENTION

The present invention provides a motion detection system including both a PIR sensor and a second sensor that is insensitive to infrared light and yet sensitive to visible light. If the first sensor generates a first output signal indicative of motion then an alarm signal is generated only if the second sensor does not generate a second output signal correlating in time and/or magnitude to the first output signal.

The invention comprises, in one form thereof, a motion detection system including a first sensor sensitive to light in a first range of wavelengths in at least one detection zone and generating a first output signal representative of the detected level of light. A second sensor is sensitive to light in a second range of wavelengths and generates a second output signal representative of the detected level of light. The second sensor is positioned proximate the first sensor. A processor is programmed to generate an alarm signal based upon the first and second output signals. The alarm signal is generated when first and second conditions are satisfied. The first condition is satisfied when the first output signal indicates motion has occurred in the at least one detection zone. The second condition is satisfied when the second output signal does not correlate to the first output signal.

The invention comprises, in another form thereof, a method of detecting motion including detecting motion in at least one detection zone by sensing, at a first position, infrared light emitted from the at least one detection zone. Visible light is sensed proximate the first position. A motion detection signal is generated when both a) motion is detected in the at least one detection zone by sensing infrared light emitted from the at least one detection zone and b) the detection of motion is based upon a change in the sensed infrared light that does not correlate to a change in the sensed visible light.

The invention comprises, in yet another form thereof, a motion detection system including a first sensor capable of detecting light in both an infrared frequency range and a first visible frequency range. A second sensor is capable of detecting light in a second visible frequency range. A processor is in communication with each of the first sensor and the second sensor and generates an alarm signal only if the first sensor detects at least a first threshold level of light occurring during a time period, and the second sensor detects less than a second threshold level of light occurring during the time period. The second visible frequency range may overlap the first frequency range and/or the first and second visible frequency ranges may be substantially equal (e.g., a visible frequency range corresponding to light having wavelengths within the range of approximately 400 nm to 700 nm).

The invention comprises, in still another form thereof, a method of detecting motion including using a first sensor to detect a change in light level within a first range of wavelengths indicative of the motion or a source of a potential false alarm. A second sensor detects a change in light level within a second range of wavelengths indicative of the source of a potential false alarm. A signal indicative of the motion is issued only if the first sensor detects the change in light level within the first range of wavelengths and the second sensor fails to detect a corresponding change in light level within the second range of wavelengths.

The present invention comprises, in yet another form thereof, a method of detecting motion that includes using a first sensor to detect a change in light level within a first range of wavelengths indicative of one of the motion and a source of a potential false alarm and generating a signal indicative of motion if the first sensor detects a change of light within the first range of wavelengths. A second sensor detects a change in light level within a second range of wavelengths indicative of the source of a potential false alarm and all signals indicative of the motion generated by the first sensor are suppressed for a predefined time period when the second sensor detects a change in light level within the second range of wavelengths.

The present invention comprises, in another form thereof, a motion detection system that includes a first sensor sensitive to light in a first range of wavelengths, a second sensor sensitive to light in a second range of wavelengths and a processor in communication with each of the first and second sensors and configured to generate an alarm signal based upon signals received from each of the first and second sensors. A light emitting device is in communication with the processor and disposed in a externally visible position on the system. The second sensor is sensitive to visible light and the processor is configured to adjust a brightness of the light emitting device in response to changes in ambient visible light levels.

An advantage of the present invention is that it provides a motion detection system wherein false alarms due to visible light sources are reduced or eliminated.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3A is a plot of a light signal emitted toward the motion detection system of FIG. 1.

FIG. 3B is a plot of the voltage output of the PIR amplifier of FIG. 1.

FIG. 3C is a plot of the voltage output of the PIR high threshold comparator of FIG. 1.

FIG. 3D is a plot of the voltage output of the PIR low threshold comparator of FIG. 1.

FIG. 3E is a plot of the filtered voltage output of the photocell of FIG. 1.

FIG. 3F is a plot of the voltage output of the photocell high threshold comparator of FIG. 1.

FIG. 3G is a plot of the voltage output of the photocell low threshold comparator of FIG. 1.

Figure 1:
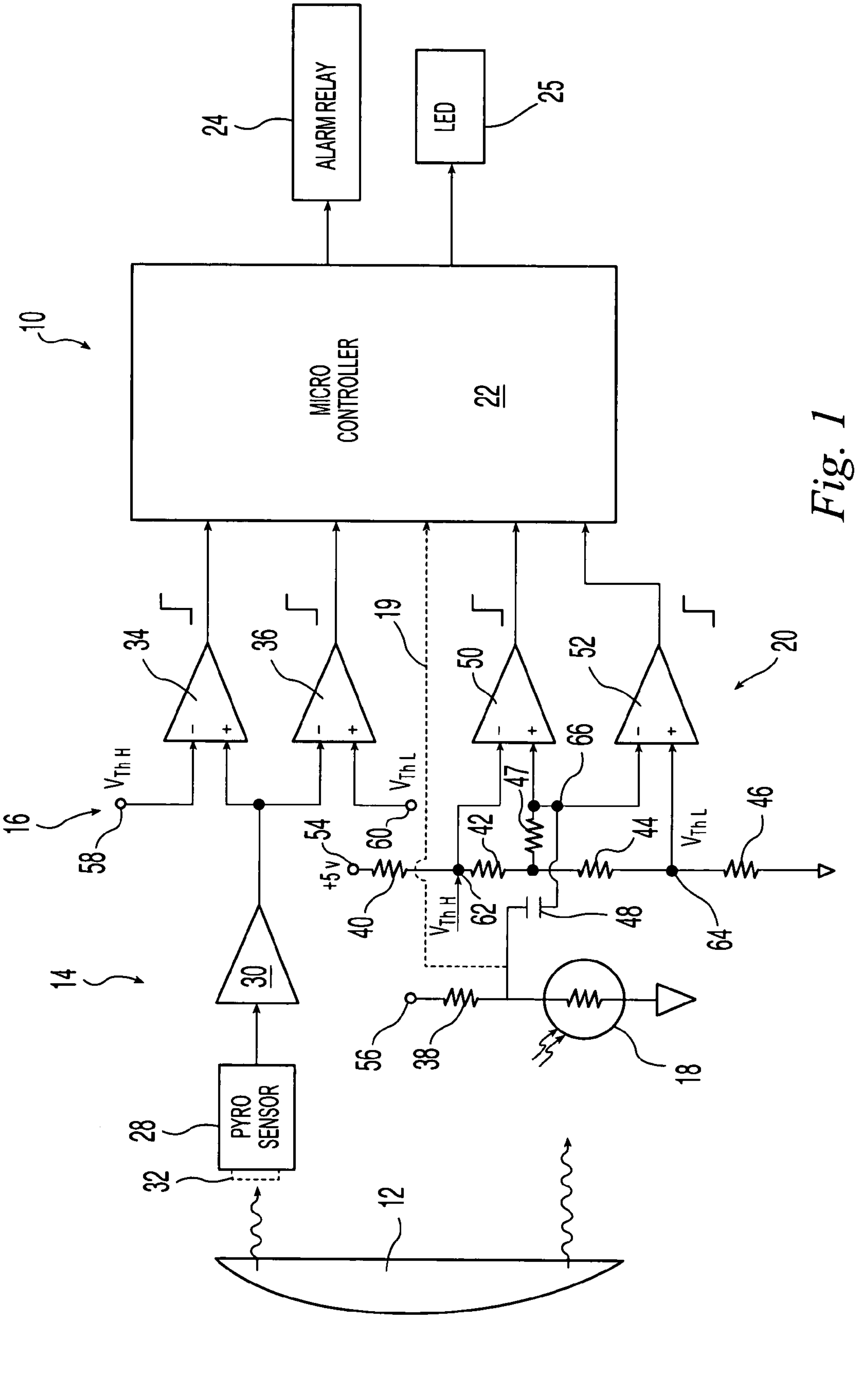
FIG. 1 is a schematic block diagram of one embodiment of a motion detection system of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Figure 2A:
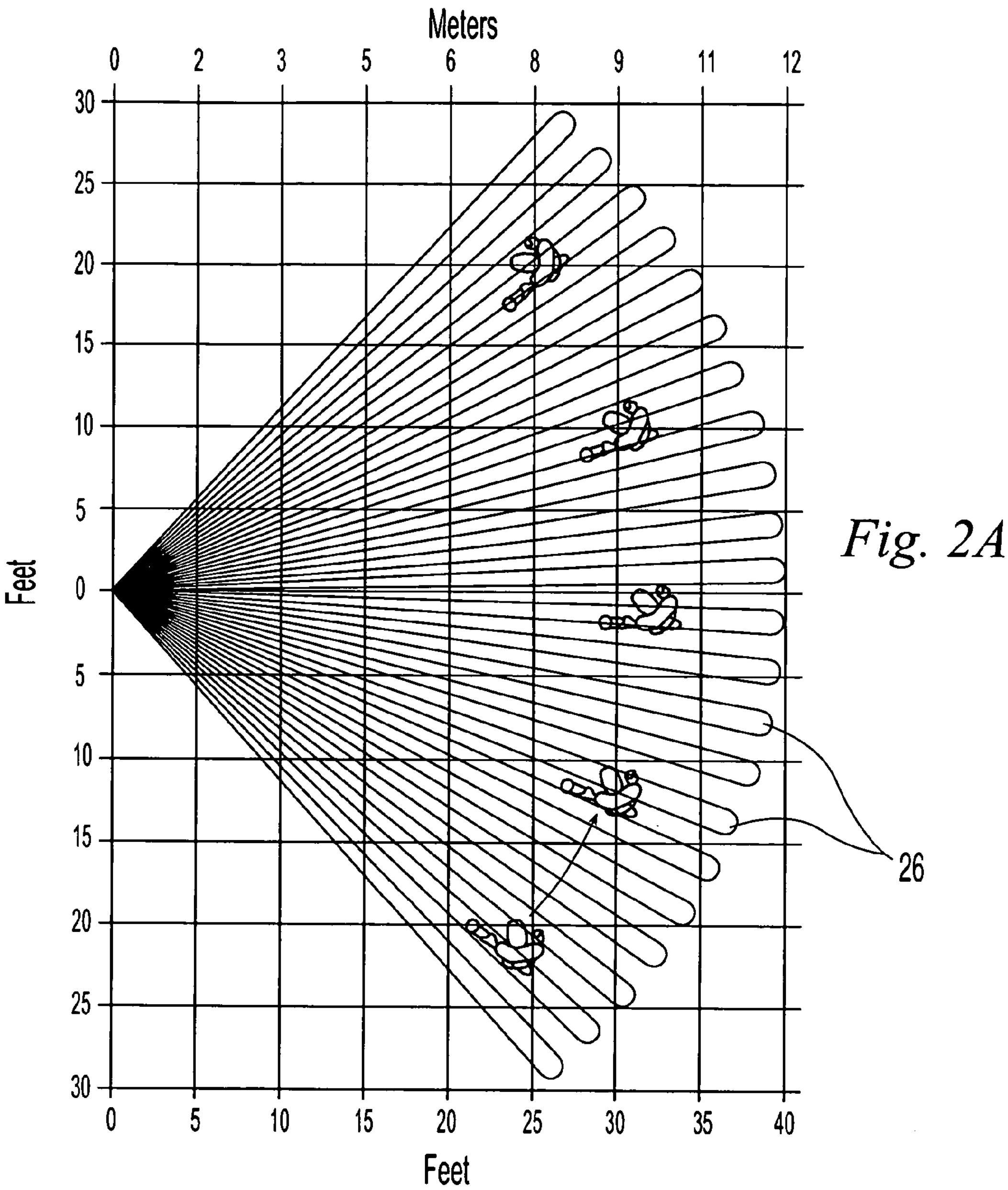
FIG. 2A is a top view of a detection pattern monitored by the motion detection system of FIG. 1.
Figure 2B:
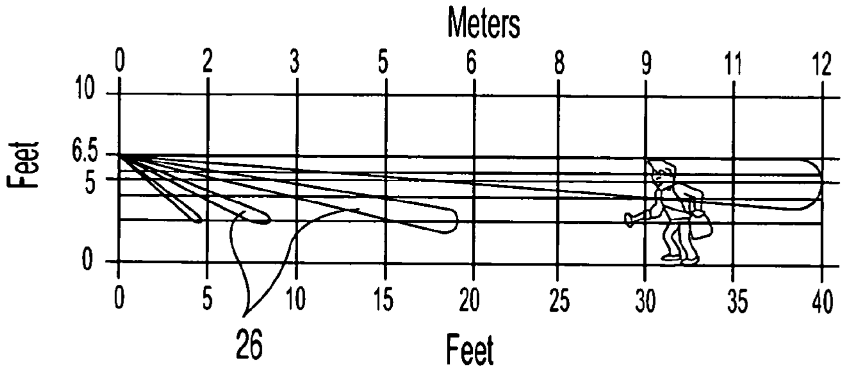
FIG. 2B is a side view of the detection pattern of FIG. 3A.

In accordance with the present invention, FIG. 1 illustrates one embodiment of a motion detection system 10 including a fresnel lens 12, a passive infrared (PIR) sensor assembly 14, a PIR comparator circuit 16, a photocell 18, a photocell comparator circuit 20, a microcontroller 22, and an alarm relay 24. Fresnel lens 12 can be formed of a pigmented polyethylene material. The type and amount of pigment in lens 12 can be selected for its infrared transmission properties, its ability to attenuate visible light, and its cosmetic appearance. Lens 12 can inhibit the passage of light having predetermined wavelengths, and thereby can function as a filtering element. Fresnel lens 12 can be multi-faceted in order to provide multiple zones or areas of detection within a room. For example, FIG. 2A illustrates an array of detection zones 26 that can be monitored by use of lens 12. That is, lens 12 enables PIR sensor assembly 14 and photocell 18 to be sensitive to infrared and visible light, i.e., detect motion, in each of the detection zones 26. As shown in FIG. 2B, the array of detection zones 26 can be fanned out in a vertical direction as well as in a horizontal direction such that more area within a monitored floor space can be covered.

Although a photocell is used in the embodiment of the invention illustrated in FIG. 1, alternative embodiments of the invention may employ sensors other than a photocell. For example, sensor 18 could be a photodiode, phototransistor, photovoltaic cell, or other suitable device. Photodiodes and phototransistors are typically sensitive to light in the visible spectrum, i.e., light having a wavelength of approximately 400 to 700 nm, and in the near infrared spectrum. Typical visible light sources emit light not only in the visible spectrum but also generate light in the infrared spectrum and many white light emitting sources have a peak emission value in the near infrared spectrum at a wavelength of approximately 1 μm. Thus, photodiodes, phototransistors, or other devices sensitive to near infrared light, e.g., light having a wavelength of approximately 1 μm, can be used with the present invention to detect light sources that might potentially generate a false alarm, even if such sensors are fitted with filters that filter light from the visible spectrum.

For example, if a first sensor is being deployed to detect the presence of an intruder by monitoring light in a first range of wavelengths, e.g., a PIR sensor monitoring changes in light in a desired wavelength range of approximately 7 to 14 μm but which also may detect changes in the levels of near infrared and visible light, a second sensor can be used to detect the emissions of a potentially false alarm triggering light source by monitoring a second wavelength range that includes only visible light (visible light is light having a wavelength of between approximately 400 and 700 nm), or which includes both visible light and near infrared light have a wavelength falling between visible light and the desired wavelength range of the first sensor, or be limited to a range that falls between visible light and the desired range of the first sensor. In other words, for the second sensor to detect a visible light emitting source that could potentially generate a false alarm, the second sensor may be sensitive to light in a range that has an upper limit that is less than 7 μm and includes wavelengths greater than 400 nm. For example, a second sensor that was sensitive to light having a wavelength of approximately 1 μm but which could not detect visible light could still be effectively employed to detect potentially false alarm triggering visible light sources.

With regard to the embodiment of FIG. 1, PIR sensor assembly 14 includes a pyroelectric sensor (pyro sensor) 28, an amplifier 30, and an optional multilayer silicon filter 32. Filter 32 is configured to filter out as much of the visible light from lens 12 as possible and to attenuate the infrared light from lens 12 as little as possible. Pyro sensor 28 converts the filtered light from filter 32 into an electrical signal. Pyro sensor 28 can be particularly sensitive to light having a wavelength approximately between 7 micrometers and 14 micrometers. Amplifier 30 receives the electrical signal from sensor 28 and amplifies the signal.

The amplified signal is received by the PIR comparator circuit 16 which includes a PIR window comparator having a PIR high threshold comparator 34 and a PIR low threshold comparator 36. High threshold comparator 34 compares the voltage of the amplified signal to a high threshold voltage value ($V_{Th\ H}$); and low threshold comparator 36 compares the voltage of the amplified signal to a low threshold voltage value ($V_{Th\ L}$). High threshold comparator 34 outputs a high threshold flag signal in the form of a logical "1" if the voltage of the amplified signal is greater than the high threshold voltage value ($V_{Th\ H}$), and outputs a logical "0" if the voltage of the amplified signal is less than the high threshold voltage value ($V_{Th\ H}$). In contrast, low threshold comparator 36 outputs a low threshold flag signal in the form of a logical "1" if the voltage of the amplified signal is less than the low threshold voltage value ($V_{Th\ L}$), and outputs a logical "0" if the voltage of the amplified signal is less than the low threshold voltage value ($V_{Th\ L}$).

Photocell sensor 18, which can be in the form of a cadmium sulfide (CdS) photocell, is disposed proximate or adjacent to pyro sensor 28 such that the visible light, i.e., white light, that penetrates lens 12 illuminates and is received by both pyro sensor 28 and photocell 18. Photocell 18 converts the light from lens 12 into an electrical signal which is received by the Photocell comparator circuit 20. Comparator circuit 20 includes a plurality of voltage dividing resistors 38, 40, 42, 44, 46, an isolation resistor 47, a DC blocking capacitor 48, and a photocell window comparator having a photocell high threshold comparator 50 and a photocell low threshold comparator 52.

A voltage of +5V can be applied at node 54 to the voltage dividing circuit. The same +5V or another voltage can be applied to node 56. The threshold voltages $V_{Th\ H}$ and $V_{Th\ L}$ applied to nodes 58 and 60, respectively, can be created using a voltage dividing resistor network (not shown). The threshold voltage $V_{Th\ H}$ at node 58 is possibly but not necessarily equal to the threshold voltage $V_{Th\ H}$ at node 62. Similarly, the threshold voltage $V_{Th\ L}$ at node 60 is possibly but not necessarily equal to the threshold voltage $V_{Th\ L}$ at node 64.

DC blocking capacitor 48 filters out the slowly changing signals from photocell 18, thereby enabling the comparators 50, 52 to stabilize when photocell 18 is exposed to different background light levels. Thus, slowly changing light levels can be ignored. Only quick or sudden changes in light levels are detected by comparators 50, 52. Resistor 47 can have a resistance much greater than that of resistors 40, 42, 44, 46 so that the photocell voltage does not substantially affect the threshold voltages at nodes 62, 64.

High threshold comparator 50 compares the voltage of the signal from capacitor 48 to a high threshold voltage value ($V_{Th\ H}$); and low threshold comparator 52 compares the voltage of the signal from capacitor 48 to a low threshold voltage value ($V_{Th\ L}$). High threshold comparator 50 outputs a high threshold flag signal in the form of a logical "1" if the voltage of the signal from capacitor 48 is greater than the high threshold voltage value ($V_{Th\ H}$), and outputs a logical "0" if the voltage of the signal from capacitor 48 is less than the high threshold voltage value ($V_{Th\ H}$). In contrast, low threshold comparator 52 outputs a low threshold flag signal in the form of a logical "1" if the voltage of the signal from capacitor 48 is less than the low threshold voltage value ($V_{Th\ L}$), and outputs a logical "0" if the voltage of the signal from capacitor 48 is less than the low threshold voltage value ($V_{Th\ L}$).

Changes in the output states of comparators 34, 36, 50, 52, which may all be voltage comparators, are referred to herein as "threshold crossings". Threshold crossings associated with comparators 34, 36 can be indicative of infrared light or visible light being sensed by pyro sensor 28. Threshold crossings associated with comparators 50, 52 can be indicative of visible light being sensed by photocell 18.

Microcontroller 22 receives the digital inputs from comparators 34, 36, 50, 52 and determines whether there is a correlation or correspondence between threshold crossings associated with comparators 34, 36 and threshold crossings associated with comparators 50, 52. If there are a number of threshold crossings associated with comparators 34, 36 within a certain time period and there are not correlating threshold crossings associated with comparators 50, 52, then microcontroller 22 may conclude that the threshold crossings associated with comparators 34, 36 are due to a change in the level of infrared light being received by pyro sensor 28. Since a change in infrared light may indicate the presence of an intruder, microprocessor 22 might then generate an alarm signal and transmit the motion detection signal or "alarm signal" to alarm relay 24, thereby instructing alarm relay 24 to take countermeasures, such as sounding an alarm, turning on one or more lights and/or notifying the police, for example.

If, on the other hand, there are a number of threshold crossings associated with comparators 34, 36 within a certain time period and there are correlating threshold crossings associated with comparators 50, 52, then microcontroller 22 may conclude that the threshold crossings associated with comparators 34, 36 are due to a change in the level of visible light being received by pyro sensor 28. A change in visible light may indicate things other than the presence of an intruder, such as a car headlight or flashlight being momentarily pointed toward motion detection system 10. For this reason, microprocessor 22 may decide to not generate an alarm signal in response to the change in visible light.

Thus, microcontroller 22 may be programmed to generate an alarm signal based upon the output signals of pyro sensor 28 and photocell 18 only if two conditions are satisfied. The first condition is satisfied when the output signal from pyro sensor 28 indicates that motion has occurred in at least one detection zone. The second condition is satisfied when the output signal from photocell 18 does not correlate to the output signal from pyro sensor 28. That is, the amplified output signal from pyro sensor 28 and the output signal from photocell 18 may both exceed their respective high threshold values when the second condition is not satisfied.

Stated another way, sensor 28 and photocell 18 detect light at different wavelengths with sensor 28 detecting light at a range of wavelengths selected to detect intruders and photocell 18 detecting light at a range of wavelengths selected to detect events that are likely to cause sensor 28 to generate a false alarm. Thus, when sensor 28 indicates the presence of an intruder, photocell 18 is used to determine whether there is a corresponding false alarm triggering event and, if photocell 18 has detected an event capable of triggering a false alarm, the alarm signal is suppressed, while if photocell 18 has not detected such an event, the alarm signal is not suppressed.

In determining whether there is a correlation between the threshold crossings associated with comparators 50, 52 and the threshold crossings associated with comparators 34, 36, microcontroller 22 can take into account any time delay that exists between a time at which photocell 18 reacts to light and a time at which pyro sensor 28 reacts to light. After receiving light, pyro sensor 28 may have a slight delay, such as approximately 60 milliseconds, before the amplified output of pyro sensor 28 exceeds $V_{Th\ H}$, as determined by comparator 34. The time delay can be due to the physical limitations of pyro sensor 28. In comparison, the output voltage photocell 18 can react almost instantaneously to light. Thus, in one embodiment, the second condition is not satisfied only when the amplified output signal from pyro sensor 28 exceeds its threshold value at a first time, the output signal from photocell 18 exceed its high threshold value at a second time, and the first and second times are separated by no more than a predetermined time delay value, such as 60 milliseconds.

FIGS. 3A-G illustrate various exemplary waveforms that may occur in system 10 when a visible light pulse is received by lens 12. More particularly, FIG. 3A is a plot of light level vs. time for a light pulse of approximately 0.5 second duration that is directed at lens 12. FIG. 3B illustrates the resulting voltage vs. time waveform at the output of amplifier 30. FIG. 3C illustrates the voltage output of comparator 34 vs. time. As mentioned above, there may be a delay time $t_{d1}$ between the time that the light pulse first impinges upon lens 12 and the time when the output of amplifier 30 exceeds the high threshold voltage at node 58. Since pyro sensor 28 reacts to sudden changes in light level rather than to the magnitude of the light level, the voltage output of amplifier 30 peaks and then decreases toward its steady state level. The steady state level is greater than the low threshold value and less than the high threshold value.

When the light level again undergoes a sudden change, i.e., when the light pulse ends, the voltage output of amplifier 30 drops below the steady state value and continues to drop below the low threshold voltage value. FIG. 3D illustrates the voltage output of comparator 36 vs. time. Due to the slower response of pyro sensor 28, there may be a delay time $t_{d2}$ between the time that the light pulse stops impinging upon lens 12 and the time when the output of amplifier 30 falls below the low threshold voltage at node 60. The delay time $t_{d2}$ may be approximately 60 milliseconds, and may be greater than, less than, or approximately equal to the delay time $t_{d1}$. Again, since pyro sensor 28 reacts to sudden changes in light level rather than to the magnitude of the light level, the voltage output of amplifier 30 bottoms out and then increases back to its steady state level that is between the low threshold value and the high threshold value.

FIG. 3E illustrates the resulting voltage vs. time waveform at the output of capacitor 48 at node 66. Since photocell 18 reacts relatively quickly to changes in light level, the voltage at node 66 appears to spike up to a level above the high threshold voltage at node 62 almost instantaneously. Since capacitor 48 filters out the DC component of the voltage output of photocell 18, the voltage at node 66 quickly drops back to its steady state value after the output voltage of photocell 18 has stabilized. FIG. 3F illustrates the resulting output voltage at comparator 50.

FIG. 3E also shows that, when the light pulse turns off, the voltage at node 66 appears to drop down below the low threshold voltage at node 64 almost instantaneously. Again, due to the effect of the DC blocking capacitor 48, the voltage at node 66 quickly rises back to its steady state value after the output voltage of photocell 18 has stabilized. FIG. 3G illustrates the resulting output voltage at comparator 52.

When determining whether there is a correlation between the outputs of pyro sensor 28 and photocell 18, microcontroller 22 checks whether each pulse output by comparator 34 has a corresponding pulse output by comparator 50. More particularly, microcontroller 22 can check whether a delay time $t_{d1}$ between the leading edge of a pulse from comparator 34 and the leading edge of a pulse from comparator 50 is less than a predetermined time period, such as 60 milliseconds. If the delay time $t_{d1}$ is less than the predetermined time period, then microcontroller 22 may decide that the pulse from comparator 34 is due to visible light rather than a source of infrared light. In this case, microcontroller 22 would not send an alarm signal to alarm relay 24.

Additionally, microcontroller 22 can check whether a delay time $t_{d2}$ between the leading edge of a pulse from comparator 36 and the leading edge of a pulse from comparator 52 is less than a predetermined time period, such as 60 milliseconds. This predetermined time period that is compared to delay time $t_{d2}$ may be less than, greater than, or equal to the predetermined time period that is compared to delay time $t_{d1}$. Again, if the delay time $t_{d2}$ is less than the predetermined time period, then microcontroller 22 may decide that the pulse from comparator 36 is due to visible light rather than a source of infrared light. Again, in this case, microcontroller 22 would not send an alarm signal to alarm relay 24.

The parameters of the algorithm used by microcontroller 22 to decide whether to send an alarm signal to alarm relay 24 can vary depending upon the particular application. The parameters can include the values of the delay times, the values of the threshold voltages, how many threshold crossings must occur before an alarm signal can be sent, the duration of the time period in which the threshold crossings must occur before an alarm signal can be sent, the number of pulses from comparators 34 and/or 36 that must occur without correlating pulses from comparators 50 and/or 52 before an alarm signal can be sent, etc.

For example, in one alternative embodiment, microcontroller 22 may suppress all alarm signals to alarm relay 24 for a predefined and relatively extended time period, e.g., 10 seconds, after photocell 18 has detected a change in the visible light level without comparing the outputs of the pyro sensor 28 and the photocell 18. This method of operating the system will prevent changes in the light from triggering an alarm but does present the possibility that an intruder could purposely disable the system by briefly or repetitively shining a light on the detector and move through the detection zones within time period the alarm signals are being suppressed. The ability of an intruder to sabotage the system can be substantially eliminated, however, by utilizing more than one system to cover a given area.

Also illustrated in FIG. 1 is a light emitting diode (LED) 25. Intrusion detection systems often include externally viewable LEDs to display the status of the system. For example, a steady light may indicate the system is operating normally while a blinking light may be used to indicate a malfunction in the system. Typically, the lighting in which the system, and the externally viewable LED, is placed changes over the course of a day and the brightness of the LED is chosen based upon an average light level. As a result, when the ambient light level is relatively bright, the LED may be relatively dim and difficult to view and, when the ambient light level is low, the LED may be overly bright and attract undesirable attention to the system. By utilizing photocell 18 or other device sensitive to visible light, microcontroller 22 can be used to monitor the ambient visible light level and adjust the brightness of LED 25. For example, dashed line 19 illustrates how system 10 could be modified to communicate a signal from photocell 18 to microcontroller 22 that is representative of the ambient light level. Microcontroller 22 could then adjust the brightness of LED 25 by the use of a pulse-modulated electrical signal. Advantageously, the brightness of the LED is adjusted as the ambient light level changes so that a person can readily distinguish between the lighted/unlighted condition of the LED when viewing the LED without the LED being so bright as to attract attention to the system.

While this invention has been described as having an exemplary design, the present invention may be further modified within the spirit and scope of this disclosure. This application is therefore intended to cover any variations, uses, or adaptations of the invention using its general principles.

What is claimed Is:

1. A motion detection system comprising:

a first sensor sensitive to light in a first range of wavelengths in at least one detection zone and generating a first output signal representative of the detected level of light in said first range;

a second sensor sensitive to light in a second range of wavelengths, different from said first range, and generating a second output signal representative of the detected level of light in said second range, said second sensor being positioned proximate said first sensor; and a processor, said processor comparing said first output signal to a first threshold value and said second output signal to a second threshold value, said processor programmed to generate an alarm signal based upon said first and second output signals, whereby said alarm signal is generated when first and second conditions are satisfied, said first condition being satisfied when said first output signal exceeds said first threshold value at a first time, and said second condition being satisfied when said second output signal does not exceed said second threshold value beginning at a second time, said first and second times separated by no more than a predetermined amount of time.

2. The motion detection system of claim 1 further comprising:

a first high threshold comparator and a first low threshold comparator operatively disposed between said first sensor and said processor, said first high threshold comparator generating a first high threshold flag signal when said first output signal exceeds a first high threshold value, said first low threshold comparator generating a first low threshold flag signal when said first output signal exceeds a first low threshold value;

a second high threshold comparator and a second low threshold comparator operatively disposed between said second sensor and said processor, said second high threshold comparator generating a second high threshold flag signal when said second output signal exceeds a second high threshold value, said second low threshold comparator generating a second low threshold flag signal when said second output signal exceeds a second low threshold value; and wherein said second condition is not satisfied when both said first output signal exceeds one of said first threshold values and said second output signal exceeds one of said second threshold values and said first output signal exceeds said one first threshold value beginning at a first time and said second output signal exceeds said one second threshold value beginning at a second time and said first and second times are separated by no more than a predetermined time delay value.

3. The motion detection system of claim 2 wherein said one first threshold value and said one second threshold value are either both high threshold values or both low threshold values.

4. The motion detection system of claim 2 wherein said comparators are all voltage comparators.

5. The motion detection system of claim 2 wherein said predetermined time delay value is no greater than approximately 60 milliseconds.

6. The motion detection system of claim 1 further comprising a filtering element disposed between said first sensor and said at least one detection zone wherein said filter inhibits the passage of light having predetermined wavelengths.

7. The motion detection system of claim 6 wherein said filtering element is a pigmented fresnel lens.

8. The motion detection system of claim 1 wherein there are a plurality of detection zones.

9. The motion detection system of claim 1 wherein said first sensor is a pyro-electric sensor and said first range of wavelengths includes wavelengths of approximately 7 to 14 μm and said second range of wavelengths has an upper limit less than 7 μm and includes wavelengths greater than 400 nm.

10. The motion detection system of claim 1 wherein said first sensor is a pyro-electric sensor and said first range of wavelengths includes wavelengths of approximately 7 to 14 μm and said second sensor is sensitive to at least a portion of visible light having wavelengths between 400 nm and 700 nm.

11. The motion detection system of claim 1 wherein said first sensor is a pyro-electric sensor and said first range of wavelengths includes wavelengths of approximately 7 to 14 μm and said second sensor is sensitive to near infrared light having a wavelength of approximately 1 μm.

12. A method of detecting motion, said method comprising:

detecting motion in at kast one detection zone by sensing, at a first position, infrared light emitted from at least one detection zone and generating a first signal based upon said sensed infrared light;

sensing visible light proximate said first position and generating a second signal based upon said sensed visible light;

comparing said first signal representative of said sensed infrared light to a first threshold value and comparing a said second signal representative of said sensed visible light to a second threshold value;

determining if correlation exists by determining when the first signal exceeds the first threshold at a first time and when the second signal exceeds the second threshold at a second time and determining if the first and second times are separated by no more than a predetermined time delay value; and generating a motion detection signal only when such correlation is not determined.

13. The method of claim 12 wherein said predetermined time delay value is no greater than approximately 60 milliseconds.

14. The method of claim 12 wherein a pyro-electric sensor sensitive to light That includes light having a wavelength within a range of approximately 7 to 14 μm is used to sense infrared light emitted from the at least one detection zone.

15. The method of claim 12 wherein a cadmium-sulfide photocell is used to sense visible light proximate the first position.

16. A motion detection system comprising:

a first sensor capable of detecting light in both an infrared frequency range and a first visible frequency range;

a second sensor capable of detecting light in a second visible frequency range;

a processor in communication with both said first sensor and said second sensor, said processor able to sense a first threshold level of infrared light and a second threshold level of visible light, said processor configured to determine whether said first threshold level is a first predetermined amount greater than a baseline level of infrared light detected by said first sensor and whether said second threshold level is a second predetermined amount greater than a baseline level of visible light detected by said second sensor, said processor generating an alarm signal only if said first sensor detects said baseline level of infrared light exceeds said first threshold level of light occurring during a time period and said second sensor detects said baseline level of visible light being less than said second threshold level of light during said time period.

17. The motion detection system of claim 16 wherein said first sensor is sensitive to a first range of wavelengths that includes wavelengths of approximately 7 to 14 μm and said second sensor is sensitive to a second range of wavelengths that has an upper limit less than 7 μm and includes wavelengths greater than 400 nm.

* * * * *